United States Patent [19]
Converse

[11] 3,827,822
[45] Aug. 6, 1974

[54] GUIDED TOOL

[76] Inventor: David B. Converse, 41 Brookwood St., East Orange, N.J. 07017

[22] Filed: Jan. 14, 1974

[21] Appl. No.: 433,257

Related U.S. Application Data

[63] Continuation of Ser. No. 267,929, June 29, 1972, abandoned.

[52] U.S. Cl.............. 408/110, 145/129, 173/31, 308/3 A
[51] Int. Cl............................................ B23b 45/14
[58] Field of Search ....... 308/3 A; 173/31; 145/129; 408/110, 111, 112, 115, 234

[56] References Cited
UNITED STATES PATENTS
3,119,286   1/1964   Forman et al. .................... 408/110
3,141,360   7/1964   Wolf.................................. 408/110

Primary Examiner—Francis S. Husar
Attorney, Agent, or Firm—Popper, Bain, Bobis, Gilfillan & Rhodes

[57] ABSTRACT

A guided tool for controlling the attack of a tool against a work face wherein a keyway slidably mates with a key on a tool housing, so that the tool is guided toward a work piece in a predetermined attitude.

1 Claim, 4 Drawing Figures

3,827,822 ved to do the adjustments of the base 17 (not shown).

GUIDED TOOL

RELATED APPLICATION

This application is a continuation of application Ser. No. 267,929, filed June 29, 1972 and now abandoned.

BACKGROUND OF THE INVENTION

1. Field of the Invention

This invention relates generally to guided tools, and specifically to hand held guided tools, such as portable electric drills, similar electric tools or hand operated tools requiring controlled directional movement and guidance with reference to a work piece.

2. Prior Art

There is need for a small light weight hand held guiding device for guiding the movement of portable electric drills, other electric tools, or other hand tools so that, for instance, holes may be drilled at precise right-angles to, or at other preselected angles to the face of the work piece, or to preset depths of drilling or other operations, so that drilling or other operations can be easily performed on horizontal surfaces, floors, tables, or on an angularly disposed surface, or on a vertical surface, or on a ceiling, wherein the drilling or other operation is done in an upside-down position. Guided tools presently available may be of the drill press variety, where the advance of the drill is mechanically controlled and the work-piece has to be brought to the press; other guided tools may be cumbersome, mechanically complex, expensive, difficult to transport to support in operation, may require constant adjustment. Devices using guidance holes, or bushings, restrict vision, so that the user cannot see whether the drill bit is entering the work piece at the actual location desired, nor can he observe the actual drilling being done in the work piece.

SUMMARY OF THE INVENTION

It has been found that a guided tool, and particularly, a guide drill can be made which is light in weight, portable, simple, study, relatively inexpensive, has no moving mechanism while in operation, involves no complex manufacturing techniques, requires no maintenance, is easy and comfortable to use in all positions, and accurately and easily controls the direction that the drill or other tool advances against the work piece. The guided tool as a portable electric drill allows the user to select any size drill bit he wishes, within the size limits of the portable drill employed, or to use other tool bits or tools. It further allows the user maximum visibility of the work he is performing. This is accomplished by supplying a tool housing with a key and a guiding device with a keyway in slidable engagement, and a surface shaped to be gripped by the hand on the guiding device or base. The key, or other slidably engagable mating means on the tool housing, mates with and slides through the keyway in the tool housing guide unerringly directing and guiding the tool in the desired direction against the work piece for drilling, or other operations.

THE DRAWINGS

These objects and advantages as well as other objects and advantages are attained by the device shown by way of illustration in the drawings in which.

PREFERRED EMBODIMENT

Figure 1:
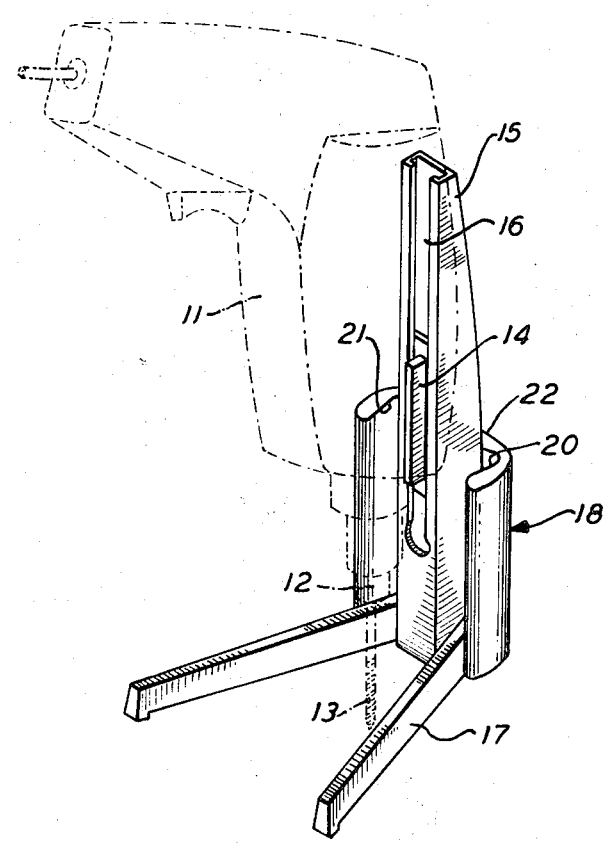
FIG. 1 is a perspective view of the tool guide or tool guiding device with a portable hand drill (in dotted lines) shown in an operating position.
Figure 2:
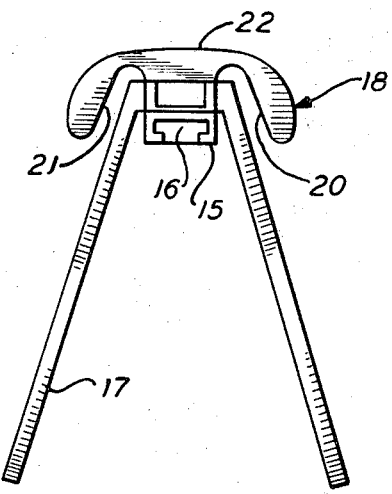
FIG. 2 is a top view thereof without the tool in position.

Referring now to the drawings in detail, the guided tool for purposes of illustration is shown as a drill, but the tool may of course be another tool such as a grinder, an impulse hammer, a screw driver, an insertion device, a hole tapper, a reamer, a soldering iron, a heat sealer, a rotary saw, an abrader, a file, a polisher, etc. As shown in the drawings, there is a tool housing 11. A chuck or holding device 12 extends from the housing, and a drill bit 13 is held by the chuck 12. An elongated key 14 is shown attached to the housing. The key may be formed integrally with the housing 11 or may be supplied separately to be attached to the housing 11 by screws by an attaching strap, or by cement. Separate attachment means is not shown. Indeed, a plurality of keys may be attached to the housing 11 to accomplish tool guidance in different attitudes other than that which is shown. Although the key 14 is shown in the form of a continues T formation, the invention is not limited to this form. The keying means can be formed by two or more short T forms spaced in alignment, and in fact can be formed by another configuration which provides slidable entrapment with a suitable elongated form in the tool guide or tool guiding device. Or, the arrangement may be reversed with the key on the tool guide and the keyway on the tool housing 11, or attached to it.

The tool guide or tool guiding device has a vertical portion (or member) 15 having a flanged slot or keyway shown in one face. The key 14 and the keyway 16 are slidably engaged and slidably entrapped with each other when they are coaxially moved with respect to each other, so that drill 13, and the drilling operation is maintained in general parallelism with the guiding means in the tool guide or tool guiding device. Although shown as a key on the tool and a keyway in the tool guide or tool guiding device, the engagement between tool and guide may take the form of and be achieved by any other suitable form configuration providing slidable engagement or slidable entrapment with respect to each other.

The drill may be removed from the tool guide by lifting the drill with its key out of the keyway.

A base 17 is part of or attached to vertical portion or vertical member 15 in a relationship so that the bottom surface of the base and the supporting surface, which the base rests on (or against) is generally perpendicular to the keyway 16 or other suitable guiding surfaces. This provides for drilling in a line perpendicular to the face of the work piece or a supporting surface. While perpendicular drilling or other operations are desirable, drilling or other operations at angles other than perpendicular may also be on occasion required. The tool guide or tool guidance device may therefore be made wherein the angle of the guiding keyway or guiding surfaces may be other than perpendicular to the bottom surface of the base 17, or means may be provided to suitably allow for changing and presetting the angle of the guiding surfaces, and the bottom surface of the base 17; thereby providing guidance of direction to drilling, or other operations, at predetermined angles other than perpendicular to the work piece or supporting surface. The base 17 is preferably U- or V-shaped, having an opening or open area into which the drill or other tool is directed so that the desired point on the work piece where the tool is to come into contact with the work piece can be easily seen, approached, positioned, and controlled without impediment. The user can thereby see the operation he is performing. The base 17 is either flat on its bottom surface, or has three coplanar surfaces, although other bottom configurations can be applied to engage different shaped workpieces, or supporting surfaces.

Although the guide tool is shown as a hand held device, it may also be provided with means for its attachment to a larger base surface or for example to a table, by means of screws, bolts, or clamps.

Figure 3:
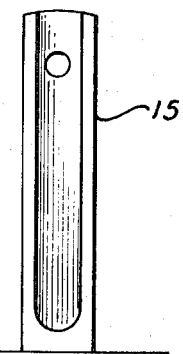
FIG. 3 is a rear elevational view thereof without the tool in position.
Figure 4:
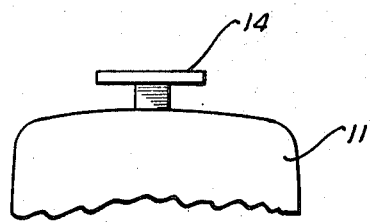
FIG. 4 is a top view of a key as part of or attached to a partial view of ] tool.
Figure 4:
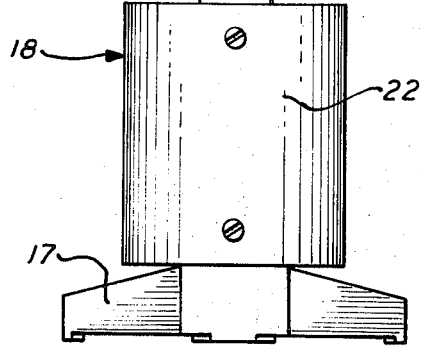

A hand grip 18 is provided as part of or attached to the guide portion or member 15 in the form of a laterally arcuate enlargement extending from the lower portion of the guided tool device. A rear convex portion 22 is provided around which the operator may place the palm and fingers of his hand to hold the guided tool. The front portion of the hand grip 18 has a pair of elongated vertical indentations 20, 21 to lighten the weight of the hand grip 18 and to receive the ends of the digits of the operator for secure holding. This provides for comfortable hand-gripping and rigid holding. While hand grip 18 is shown at the lower portion of the guided tool, it may also be placed in a higher or other location. The hand grip 18 as shown in the drawing FIG. 3 shows its attachment to the vertical portion or member 15. The hand grip 18 may also be made integrally with or attached to the base portion or member 17.

What is claimed:

1. A guided tool comprising
  a. a housing,
  b. means in the housing to drive a tool,
  c. a tool operably connected to the means,
  d. a guide,
  e. an elongated keyway in the guide,
  f. an elongated key on the housing,
  g. the key slidably engaged with the keyway,
  h. the engagement of the key in the keyway disposing the housing with the tool in a predetermined attack position with respect to a work piece,
  i. a hand-grip on the guide,
  j. a base attached to the guide for sustaining the guide,
  k. a convex rear portion on the hand-grip,
  l. a first elongated indentation on the front of the hand-grip,
  m. a second elongated indentation on the front of the hand-grip,
  n. the first and second indentations spaced apart from each other,
  o. the hand-grip dimensioned to be seized in the hand with the palm against the convex portion, the fingers wrapped around the hand-grip, the thumb at least partly in the first indentation, and at least one finger at least partly in the second indentation, whereby the grip may be securely held and the tool affirmatively positioned while being driven.

* * * * *